J. W. BARNES.
DRILL OR THE LIKE AND SOCKET THEREFOR.
APPLICATION FILED DEC. 15, 1911.
1,112,349.
Patented Sept. 29, 1914.
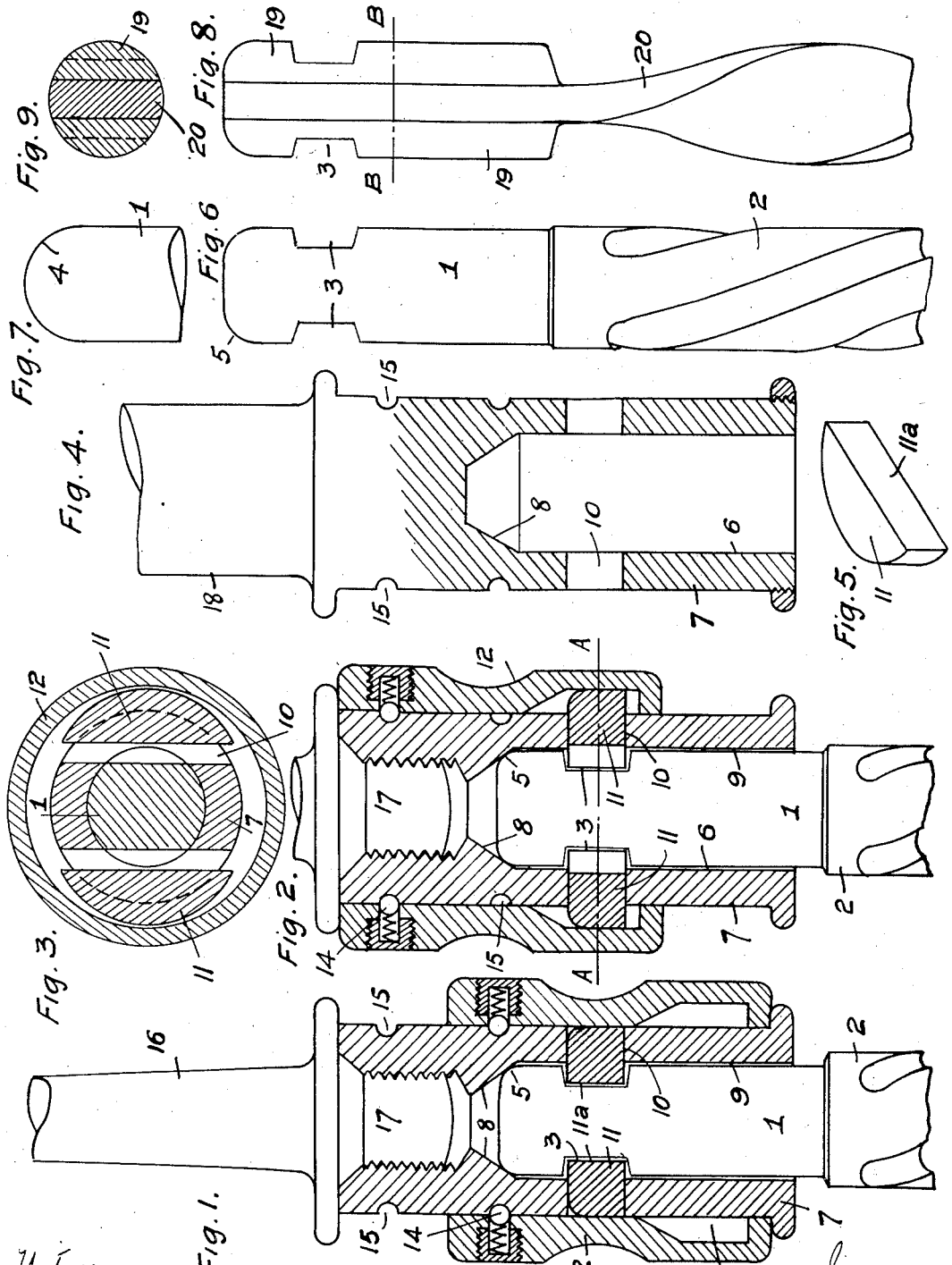

UNITED STATES PATENT OFFICE.

JOHN WILLIAM BARNES, OF ROCK FERRY, ENGLAND.

DRILL OR THE LIKE AND SOCKET THEREFOR.

1,112,349.   Specification of Letters Patent.   Patented Sept. 29, 1914.

Application filed December 15, 1911. Serial No. 665,984.

*To all whom it may concern:*

Be it known that I, JOHN WILLIAM BARNES, a subject of the King of Great Britain, and a resident of Rock Ferry, England, have invented certain new and useful Improvements in Drills or the Like and Sockets Therefor, of which the following is a specification.

This invention relates to improvements in drills or the like and in sockets for enabling the drills to be readily engaged or disengaged.

The invention is illustrated in the accompanying drawings, in which—

Figure 1. is a vertical section showing a socket and drill constructed in accordance with this invention, the socket being provided with a detachable adapter, the adapter and drill shank being in elevation. Fig. 2. is a view analogous to Fig. 1. but showing the outer sleeve moved to enable the drill shank to be disengaged from the socket. Fig. 3. is a transverse section on the line A—A of Fig. 2. Fig. 4. is a vertical section through a socket formed integral with the spindle of a drilling, boring or the like machine. Fig. 5. is a perspective view of one of the driving keys. Fig. 6. is a fragmentary elevation of a drill provided with a cylindrical shank in accordance with this invention. Fig. 7. shows a modified construction of the end of the cylindrical drill shank. Fig. 8. shows the construction adapted for forming a cylindrical shank on flat twisted drills, Fig. 9. being a section on the line B—B of Fig. 8.

According to this invention the shank 1 of the drill 2 or the like instead of being made of a Morse taper as usual is made cylindrical and has two transverse flats or recesses 3 formed in the shank near the top. The end of the cylindrical shank is rounded or domed, as shown at 4 Fig. 7., or only the end circular edge of the shank may be so rounded as indicated at 5 Fig. 6. The socket 7 for holding the drills is made with a conical inner end 8, and the bore 6 of the socket is made slightly larger in diameter than the drill shank thus leaving an annular clearance 9, so that the drill may float to a certain extent in the socket and aline itself with the hole being drilled. Two slots or perforations 10 are cut in the cylindrical wall of the socket 7 which slots, when the drill shank 1 is in position in the socket, register with the flats or recesses 3 formed in the drill shank. Segmental keys 11 Fig. 5. flat on their inner but curved on their exterior faces fit within the perforations 10 in the wall of the socket 7 and are adapted to slide radially therein, so that the inner flat faces 11ª of the keys may engage with the side recesses of the drill shank to drive the drill, or be freed therefrom by an outward radial movement the keys having a curved surface adapted to engage the inner wall of the annular recess of the sleeve 12. A sleeve 12 is mounted outside the chuck socket 7 having an inner annular recess 13. This sleeve is capable of axial movement on the exterior of the socket, and is so adapted to operate with reference to the keys 11 that when moved into such a position that the inner annular recess of the sleeve is opposite the keys as in Fig. 2. the latter may move out radially and become freed from the side recesses 3 in the drill shank by slightly rotating the said shank 1 of the drill, thus enabling the drill 2 to be readily withdrawn from the chuck. By sliding the sleeve, however, along the socket until the narrower bore of the sleeve is over the keys as in Fig. 1., the keys are pressed radially into engagement with the side recesses 3 of the drill shank. Means for limiting the positions of the sleeve, such as spring catches 14 engaging annular grooves 15 provided in the exterior of the socket. The catch members comprise the screw-threaded plugs 14' having the openings or spring-seats 14² which form a clearance for the respective catches 14 when the said catches are out of engagement with the respective annular grooves 15.

As shown in Figs. 1. and 2. the socket 7 is fitted with a detachable adapter 16 screwed at 17 into the socket. Such an arrangement permits adapters of different sizes to be fitted to the one standard size of chuck socket. Or the socket 7, as shown in Fig. 4., may be made integral with the spindle 18 of a drilling, boring or the like machine.

Where it is desired to form a cylindrical shank on a flat or twisted drill the construction shown in Figs. 8. and 9. is adopted, curved pieces 19 being riveted or welded on each side of the twisted bar 20 of the drill. The slots 3 in this form may be cut parallel to the bar passing through the center of the shank as shown in the drawings, or at right angles thereto.

It is proposed to make the cylindrical shanks to one standard size for several different sizes of drills, after the manner of the Morse taper shanks at present in use. With such a construction of the drill shank the cost of production of drills, as compared with Morse taper shanks having end tangs, is considerably reduced, while at the same time ready engagement or disengagement of the drills and the sockets is insured while the drill is running. The rounded formation of the shank end coupled with the conical formation of the socket end of the chuck and the slight clearance around the drill shank is of great advantage inasmuch as it it enables the drill to float and thus readily aline itself with the hole being drilled when the drill spindle is slightly out of center.

I claim.

In a tool chuck in combination, a socket member having a conical inner end portion, a cylindrical tool shank engaging the socket, the said tool shank being of less diameter than the diameter of the socket to provide an annular clearance between the shank and the socket, said shank having a rounded end portion adapted to engage the conical end of the socket, said shank having recesses, and the said socket having perforations, radially movable keys in the perforations, said keys being adapted to loosely engage the recesses in the shank and a sliding sleeve for controlling the movement of the keys.

In testimony whereof I affix my signature in presence of two witnesses.

JOHN WILLIAM BARNES.

Witnesses:
A. J. DAVIES,
H. WILLIAMS.